B. W. SPITLER.
PUNCTURE PLUG FOR PNEUMATIC TIRES.
APPLICATION FILED JUNE 23, 1914.
1,139,140.
Patented May 11, 1915.
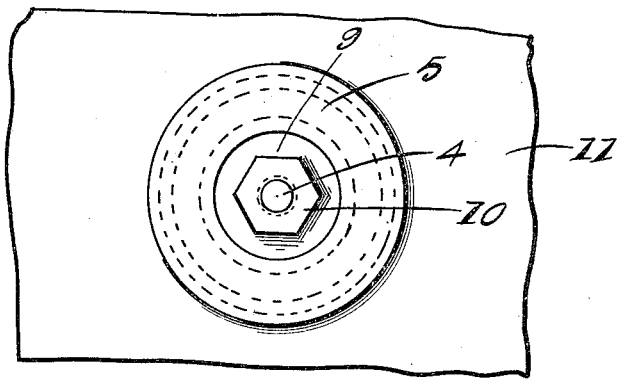
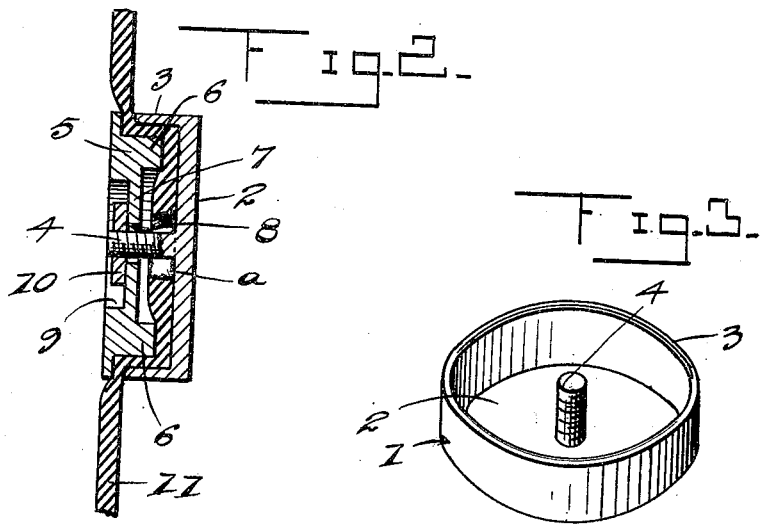
Witnesses
C. R. Bealle
T. R. Bunyea
Inventor
B. W. Spitler.
By
Attorney ated May 11, 1915.
UNITED STATES PATENT OFFICE.

BERNARD W. SPITLER, OF DORCHESTER, MASSACHUSETTS.

PUNCTURE-PLUG FOR PNEUMATIC TIRES.

1,139,140.  Specification of Letters Patent. Patented May 11, 1915.

Application filed June 23, 1914. Serial No. 846,817.

*To all whom it may concern:*

Be it known that I, BERNARD W. SPITLER, a citizen of the United States, residing at Dorchester, in the county of Suffolk and State of Massachusetts, have invented certain new and useful Improvements in Puncture-Plugs for Pneumatic Tires; and I do hereby declare the following to be a full, clear, and exact description of the invention, such as will enable others skilled in the art to which it appertains to make and use the same.

This invention relates to puncture plugs for pneumatic tires, and one of the principal objects of the invention is to provide a simple, convenient and reliable repair device for closing punctures in the outer tire or tube of pneumatic vehicle tires.

Another object of the invention is to provide a plug which can be connected to the inner tube of a pneumatic tire at the point of puncture for rendering the inner tube absolutely air tight without forming a projection beyond the outer surface of said inner tube.

These and other objects may be attained by means of the construction illustrated in the accompanying drawing, in which, Figure 1 is a view in elevation of the puncture plug shown upon the outside of a portion of an inner tube, Fig. 2 is a central section taken through the plug and the adjacent part of an inner tube, Fig. 3 is a perspective view of one member of the plug.

Referring to the drawing, the numeral 1 designates as an entirety, one member of the puncture plug, and it comprises the outer face 2 having an annular flange 3 extending around the same, while projecting from the inner side of the portion 2 is a threaded pin 4. The coacting member 5 of the plug is provided with an annular flange 6 slightly smaller in diameter than the flange 3 on the member 1 and adapted to fit therein. A web 7 extends across between the opposite sides of the annular flange 6, and said web is provided with a perforation 8 for the screw 4. A recess 9 is formed in the outer surface of the member 5, and a nut 10 is fitted on the threaded pin 4.

In applying the plug, the member 1 is first inserted through the puncture *a* by stretching the material sufficiently for the purpose and permitting the threaded pin 4 to extend through the puncture and through the perforation 8 in the web 7. The member 5 is then pushed down until the nut 10 can be started on the pin 4. By turning the nut 10 firmly on the pin 4, the two members of the plug will firmly clamp the material of the tire or tube 11 between them and form a vacuum closure which will not require a projection beyond the outer surface of the tube 11 and which will be reliable and efficient in use.

The puncture plugs may be made of any suitable size and can be quickly secured in place, thus eliminating the necessity for patches and providing devices which can be used over and over again, which are not expensive to manufacture and which can be sold at a reasonable price.

Various changes may be made in the details of construction without departing from the spirit and scope of the invention as defined in the claim.

What is claimed is:—

A puncture plug comprising a circular member having a peripheral flange extending at right angles to the body portion thereof, and a threaded pin extending from the center of the body portion beyond the outer edge of said flange, and a circular coacting member provided with an angular flange of less diameter than and adapted to fit within the first mentioned flange to fold the material at right angles, and to clamp the material between the base of the flange and the body of the circular member, said coacting member having a recess in its outer face and provided with an aperture through which said threaded pin extends, and a nut fitted to said pin within said recess, said coacting member being provided with an outwardly extending flange, the periphery of which is co-extensive with the flange of the circular member.

In testimony whereof I affix my signature in presence of two witnesses.

BERNARD W. SPITLER.

Witnesses:
JOHN F. BRIRY,
TIMOTHY A. KELLIHER.

Copies of this patent may be obtained for five cents each, by addressing the "Commissioner of Patents, Washington, D. C."